J. F. TRITLE.
SYSTEM OF MOTOR CONTROL.
APPLICATION FILED JULY 1, 1908.
917,189.
Patented Apr. 6, 1909.
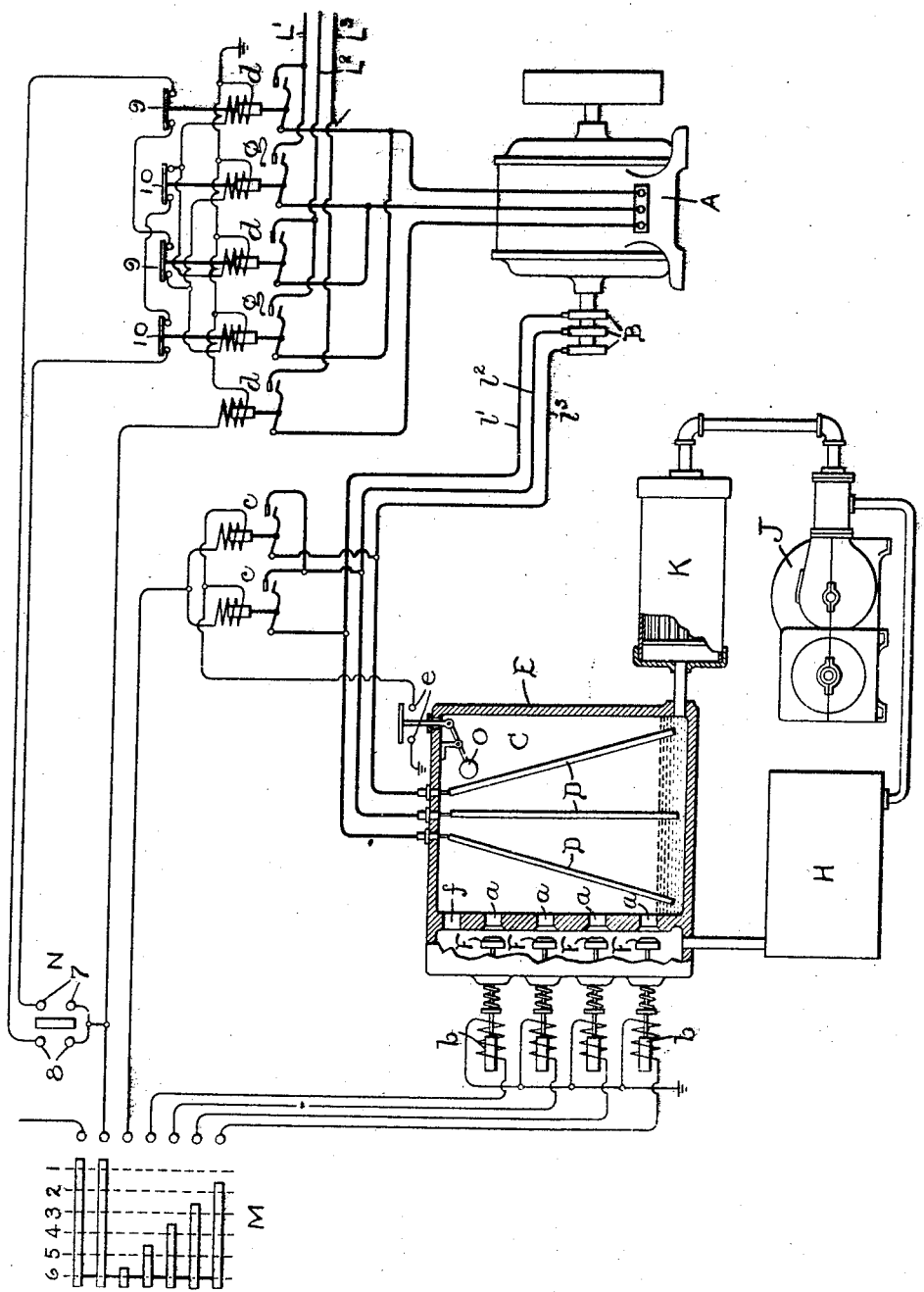
WITNESSES
INVENTOR
JOHN F. TRITLE
BY
ATT'Y

UNITED STATES PATENT OFFICE.

JOHN F. TRITLE, OF SCHENECTADY, NEW YORK, ASSIGNOR TO GENERAL ELECTRIC COMPANY, A CORPORATION OF NEW YORK.

SYSTEM OF MOTOR CONTROL.

No. 917,189.        Specification of Letters Patent.        Patented April 6, 1909.

Application filed July 1, 1908. Serial No. 441,291.

*To all whom it may concern:*

Be it known that I, JOHN F. TRITLE, a citizen of the United States, residing at Schenectady, county of Schenectady, State of New York, have invented certain new and useful Improvements in Systems of Motor Control, of which the following is a specification.

My invention relates to systems of motor control, and more particularly to such a system employing a liquid rheostat.

My system of control is advantageous when employed in connection with two or more locomotives driven by induction motors and running in parallel, as it assures the equal distribution of the load between the several motors. I start the motors by means of switches in their primary circuits and control their speed by means of liquid rheostats connected in the secondary circuits of the motors. These rheostats have a constant circulation of liquid through them, and a plurality of electrically operated valves arranged one above another. By operating the valves in succession on each motor car and by operating similarly placed valves on all of the motor cars in a train or otherwise connected to the same load at the same time, the liquid level in all of the rheostats is kept at practically the same height and consequently the motors tend to run at the same speed and divide the load equally.

My invention also consists in an induction motor control system comprising a liquid rheostat connected in the secondary circuit of the motor means for causing a circulation of liquid through the rheostat, a plurality of electrically operated valves arranged one above another in said rheostat, an electrically operated switch or switches for short-circuiting the secondary circuit of the motor, a control switch for closing said valves in succession and said short-circuiting switch or switches after the valves have been closed, and means controlled by the level of the liquid in said rheostat for keeping the control circuit of the short-circuiting switches open or otherwise preventing their operation until the liquid has reached a predetermined height in said rheostat.

My invention further consists in the combination with a liquid rheostat comprising a tank, and a plurality of valves in said tank arranged one above another, of means for causing a circulation of liquid through said tank and means for operating said valves in succession.

Other features of my invention are pointed out with particularity in the claims annexed to and forming a part of this specification. For a better understanding of my invention, however, reference may be had to the following description taken in connection with the accompanying drawing, which shows diagrammatically a control system embodying my invention.

Referring to the drawings, A is an induction motor having taps in its secondary winding brought out to collector rings B.

The liquid rheostat C has plates or blades D which are connected by means of the conductors $l^1$, $l^2$ and $l^3$ to the collector rings B of the motor. The tank E of the rheostat has the openings $a$ one above another and arranged to be closed by the valves F, which I have shown as being operated by means of the solenoids $b$. I prefer to use a solution of soda for the rheostat, which is contained in the tank H and is circulated by means of the pump J through the cooling coils K.

$c$ are electrically operated switches for short-circuiting the secondary winding of the motor, and $d$ and $g$ are switches arranged between the conductors $L^1$, $L^2$ and $L^3$ leading from a source of alternating current and the primary winding of the motor A.

M is a control switch for controlling the operation of the switches $d$ and $g$, the valves F and switches $c$.

N is a reversing switch for reversing the circuit connections of the primary winding of the motor A.

O is a float which, when the level of the liquid in the rheostat reaches a predetermined height, operates to electrically connect the contacts $e$ in the control circuit of the short-circuiting switches $c$.

It will be noted that the lowest opening $a$ in the tank E is so positioned that liquid always surrounds the ends of the plates D, and consequently the secondary winding of the motor is never open-circuited. Moving the contacts and drum of reversing switch N relative to one another so as to connect contacts 7 together, and moving the control switch M to position 1, the line conductors $L^1$, $L^2$ and $L^3$ are connected to the motor primary. Interlocks 9 and 10 on the switches $d$ and $g$ prevent the line conductors from being short-circuited by improper operation of these switches. The closing of switches d, two of which have their actuating circuit completed through the interlocks 10 on switch g, supplies the motor with current and it starts. The movement of the control switch into positions 2 to 5 inclusive operates the valves F in succession and closes the openings a one after another. The liquid rises in the tank and covers a greater surface of the plates D, thereby decreasing the resistance in the secondary circuit of the motor until finally it practically short-circuits the plates D, the additional liquid pumped into the tank now overflows through the opening f. When the level of the liquid reaches this opening f, the float is raised and operates to connect the contacts e together. If the control switch is now moved to position 6, the actuating circuit for the switches c is made, and they directly short-circuit the secondary of the motor. If the control switch M is moved into position 6 before the liquid has been given time to reach the level of the opening f, the float O will keep the actuating circuit of switches c open at the contacts e until this level is reached. Upon moving the control switch backward, after it has reached position 6, the switches c are first opened and then the valves F are opened in the reverse order of their closing, and finally the switches d are opened, thus cutting off the supply of current to the motor. If it is desired to run the motor in the opposite direction, the reversing switch N is moved so as to connect the contacts 8 together. Line conductor L³ is still connected to the same phase of the primary winding of the motor, but the connections of the other two phases are reversed with respect to line conductors L' and L², the switches g being closed through the interlocks 9 on switches d.

What I claim as new and desire to secure by Letters Patent of the United States, is:

1. In a system of control for an induction motor, a liquid rheostat connected in the secondary circuit of the motor, means for causing a circulation of liquid through said rheostat, a plurality of electrically operated valves arranged one above another in said rheostat, and means for controlling the operation of said valves.

2. In a system of motor control, an induction motor, a liquid rheostat connected in the secondary circuit of said motor, means for causing a circulation of liquid through said rheostat, a plurality of electrically operated valves in said rheostat arranged one above the other, and means for causing said valves to be operated in succession.

3. In a motor control system, an induction motor, a liquid rheostat connected in the secondary circuit of said motor, means for causing a circulation of liquid through said rheostat, a plurality of electrically operated valves arranged one above another in said rheostat, an electrically operated switch or switches for short-circuiting the secondary circuit of the motor, a control switch for closing said valves in succession and said switch or switches after said valves have been closed, and means controlled by the level of the liquid in said rheostat for keeping the control circuit of said switches open until the liquid has reached a predetermined level in said rheostat.

4. In a system of motor control, an induction motor, a liquid rheostat connected in the secondary circuit of said motor, means for causing liquid to circulate through said rheostat, a plurality of electrically operated valves arranged one above the other in said rheostat, a set of electrically operated switches arranged to short-circuit the secondary circuit of the motor, a second set of switches arranged to control the primary circuit of said motor, a control switch having its contacts arranged to first complete the actuating circuits of said second set of switches, then to complete the actuating circuits of said valves in succession and finally to complete the actuating circuits of said first mentioned switches, and means controlled by the height of liquid in said rheostat for maintaining the circuit of said first mentioned switches open until the liquid in said rheostat has reached a predetermined height in said rheostat.

5. In a motor control system, an induction motor, a liquid rheostat arranged in the secondary circuit of said motor, means for causing a circulation of liquid through said rheostat, a plurality of electrically operated valves arranged one above another in said rheostat, an electrically operated switch or switches for short-circuiting the secondary circuit of said motor, a control switch for closing said valves in succession and said switch or switches after said valves have been closed, and a float in said rheostat arranged to control the operation of said switches until the liquid has reached a predetermined level in said rheostat.

6. The combination with a liquid rheostat comprising a tank, and a plurality of valves in said tank arranged one above another, of means for causing a circulation of liquid through said tank, and means for operating said valves in succession.

7. The combination with a liquid rheostat comprising a tank, and a plurality of electrically operated valves in said tank arranged one above another, of means for causing a circulation of liquid through said tank, and a control switch for operating said valves in succession.

8. The combination with a liquid rheostat comprising a tank, and a plurality of electrically operated valves arranged one above another, of means for causing a circulation of liquid through said tank, means for controlling the operation of said valves in succession, and means for short-circuiting the rheostat, operative only when the liquid has reached a predetermined height in said tank.

9. The combination with a liquid rheostat comprising a tank, and a plurality of electrically operated valves arranged one above another, of means for causing a circulation of liquid through said tank, a switch or switches for short-circuiting said rheostat, a control switch for closing said valves in succession and said switch or switches after said valves have closed, and means in said rheostat arranged to keep said switch or switches open until the liquid has reached a predetermined level.

10. The combination with a liquid rheostat comprising a tank, and a plurality of electrically operated valves arranged one above the other, of means for causing a circulation of liquid through said tank, a switch or switches for short-circuiting said rheostat, a control switch for closing said valves in succession and said switch or switches after said valves have closed, and a float in said tank for keeping the control circuit of said switch or switches open until the liquid has reached a predetermined level.

11. In a system of control for an induction motor, a liquid rheostat connected in the secondary circuit of the motor, means for causing a circulation of liquid through said rheostat, means for cooling the liquid, a plurality of electrically operated valves arranged one above the other, and means for controlling the operation of said valves.

12. In a system of motor control, an induction motor, a liquid rheostat connected in the secondary circuit of said motor, means for causing a circulation of liquid through said rheostat, means for cooling the liquid, a plurality of electrically operated valves in said rheostat arranged one above another, and means for causing said valves to be operated in succession.

13. The combination with a liquid rheostat comprising a tank and a plurality of valves in said tank arranged one above the other, of means for causing a circulation of liquid through said tank, means for cooling the liquid, and means for operating said valves in succession.

14. The combination with a liquid rheostat, comprising a tank and a plurality of electrically operated valves arranged one above the other, of means for causing a circulation of liquid through said tank, means for cooling the liquid, means for controlling the operation of said valves in succession, and means for short-circuiting the rheostat, operative only when the liquid has reached a predetermined height in said tank.

In witness whereof, I have hereunto set my hand this 30th day of June, 1908.

JOHN F. TRITLE.

Witnesses:
   BENJAMIN B. HULL,
   HELEN ORFORD.